(12) United States Patent
Kurashima (10) Patent No.: US 8,469,608 B2
(45) Date of Patent: Jun. 25, 2013

(54) OPTICAL TRANSCEIVER WITH ENHANCED EMI TOLERANCE

(75) Inventor: Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 362 days.

(21) Appl. No.: 12/878,318

(22) Filed: Sep. 9, 2010

(65) Prior Publication Data
US 2011/0064364 A1  Mar. 17, 2011

(30) Foreign Application Priority Data
Sep. 16, 2009  (JP) ................................ 2009-214919

(51) Int. Cl.
*G02B 6/36* (2006.01)
*H05K 9/00* (2006.01)

(52) U.S. Cl.
USPC ............................................. 385/92; 361/818

(58) Field of Classification Search
USPC .......................... 385/92–93, 89; 361/816, 818
See application file for complete search history.

(56) References Cited

U.S. PATENT DOCUMENTS

| | | | |
|---|---|---|---|
| 6,430,061 B1 * | 8/2002 | Grant et al. .................... | 361/816 |
| 6,817,782 B2 | 11/2004 | Togami et al. | |
| 2006/0045436 A1 * | 3/2006 | Wang et al. ..................... | 385/92 |
| 2006/0078261 A1 * | 4/2006 | Endou et al. .................... | 385/92 |
| 2008/0019643 A1 * | 1/2008 | Teo et al. ......................... | 385/76 |

* cited by examiner

*Primary Examiner* — Eric Wong
(74) *Attorney, Agent, or Firm* — Venable LLP; Michael A. Sartori; Tamatane J. Aga (57) ABSTRACT

An optical transceiver with an enhanced EMI shielding is disclosed. The optical transceiver of the invention provides an optical receptacle made of metal and an optical subassembly with a metal cover assembled with the optical receptacle. The metal cover electro-magnetically divides the inside from the outside of the transceiver. The metal cover provides a plate portion and an edge portion, where the former portion forms an opening through which the sleeve passes without coming in contact with the metal cover, while, the latter of which comes in contact with the receptacle.

12 Claims, 14 Drawing Sheets

OPTICAL TRANSCEIVER WITH ENHANCED EMI TOLERANCE

BACKGROUND OF THE INVENTION

1. Field of the Invention

The present invention related to an optical transceiver with enhance electro-magnetic interference (EMI) tolerance.

2. Related Prior Art

The U.S. Pat. No. 6,817,782, has disclosed an optical transceiver with a metal shell and two optical ports each exposing a sleeve of the OSA outward. The optical port receives the external optical connector to perform the optical communication. In such an optical transceiver, the EMI shielding is necessary to prevent the radiation from leaking out from the optical transceiver, in particular, the operating speed of the optical transceiver exceeds 10 Gb/s or greater. The optical transceiver disclosed in the patent mentioned above provides, in addition to the metal shell, a disk shaped cap for the exposed sleeve to prevent the EMI radiation leaking from the vicinity around the sleeve.

The present invention is to provide a means to prevent the EMI radiation from leaking without affecting mechanical stress inducing the misalignment between the optical receptacle and the optical subassembly.

SUMMARY OF THE INVENTION

An optical transceiver of the present invention comprises a metal frame, a receptacle, and an optical subassembly. The optical subassembly includes a sleeve and a body, wherein the latter of which is enclosed in a space formed by the frame and the receptacle. The space may be electrically shielded to enhance the EMI tolerance of the optical transceiver, except for a portion where the sleeve exposes to receive an optical connector. A feature of the preset invention is that the optical transceiver may further comprise a metal cover that is fixed to the receptacle and has an opening through which the sleeve of the optical subassembly passes but the metal cover is physically apart from the sleeve. Because the metal cover of the present invention is thus configured, the sleeve becomes free from the mechanical stress influenced by the metal cover by fixing to the receptacle, and the optically misalignment may be prevented even the optical subassembly with the metal cover is aligned and fixed to the receptacle.

Because the metal cover may shield a portion close to an outer periphery of the sleeve, the EMI radiation leaking from the optical transceiver, in particular, the radiation propagating along the longitudinal direction from the front side of the optical transceiver, may be effectively and reduced.

The optical transceiver of the present invention may further provide a side cover made of metal that covers whole sides of the body of the optical subassembly. The side cover may have a cross section of an Ω-shape with a pair of legs folded outward and a flat top. The leg may come in contact with the metal frame of the optical transceiver, while, the flat top may come in contact with a rear portion of the receptacle.

The optical transceiver may still further provide a ground finger. The receptacle in the rear portion thereof may have an overhung portion, and the ground finger in the cross section thereof may provide a shape tracing the overhung portion of the receptacle. The flat top of the side cover may come in contact with the overhung portion through the ground finger.

While, the ground finger may come in contact with the metal cage provided in the host system, into which the optical transceiver is inserted; in order to stabilize the ground potential of the optical transceiver. Thus, the side cover of the invention may come in contact with the ground, exactly, the frame ground of the host system, not only to stabilize the ground potential thereof but the effectively shield the optical subassembly by the frame ground.

BRIEF DESCRIPTION OF THE DRAWINGS

The foregoing and other purposes, aspects and advantages will be better understood from the following detailed description of a preferred embodiment of the invention with reference to the drawings, in which:

FIG. 4 shows two optical subassemblies and the metal cover installed in the optical transceiver, wherein FIG. 4 is viewed from the front of the optical transceiver;

FIGS. 6A and 6B show the metal cover, wherein FIG. 6A is viewed from the rear; while, FIG. 6B is viewed from the front;

DETAILED DESCRIPTION OF PREFERRED EMBODIMENTS

Next, preferred embodiments according to the present invention will be described as referring to accompanying drawings. In the description of the drawings, the same numerals or the same symbols will refer to the same elements without overlapping explanations thereof.

(First Embodiment)

Figure 1:
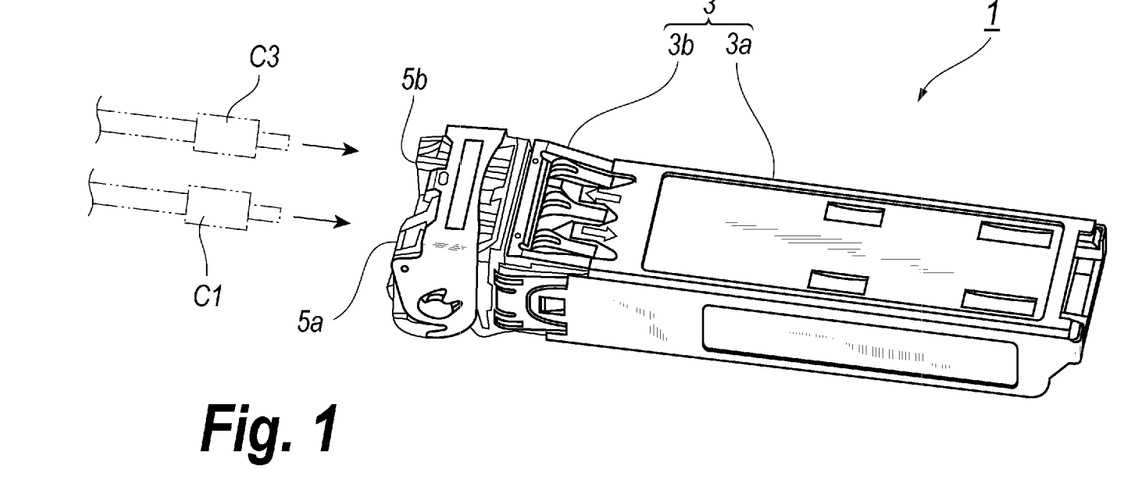
FIG. 1 is an external appearance of an optical transceiver that installs optical subassemblies according to the present invention.

An optical transceiver 1 shown in FIG. 1 is an apparatus that couples with and optical connector C1 for the optical reception and that C3 for the optical transmission, each of which is inserted from the forward of the optical transceiver 1 to communicate optically with an external apparatus. The description presented herein below assumes that the front corresponds to a side where the optical connectors, C1 and C3, are inserted therein, while the rear is opposite thereto.

The optical transceiver 1 has a metal housing 3 which includes a frame 3a and a receptacle 3b assembled with the frame 3a and extended forwardly therefrom. The receptacle 3b provides two openings, 5a and 5b, in the front end thereof, into which the optical connectors, C1 and C3, are inserted. In the deep end of the openings, 5a and 5b, is provided with a mechanism to prevent the optical connector from slipping out from the opening unintentionally.

Figure 2:
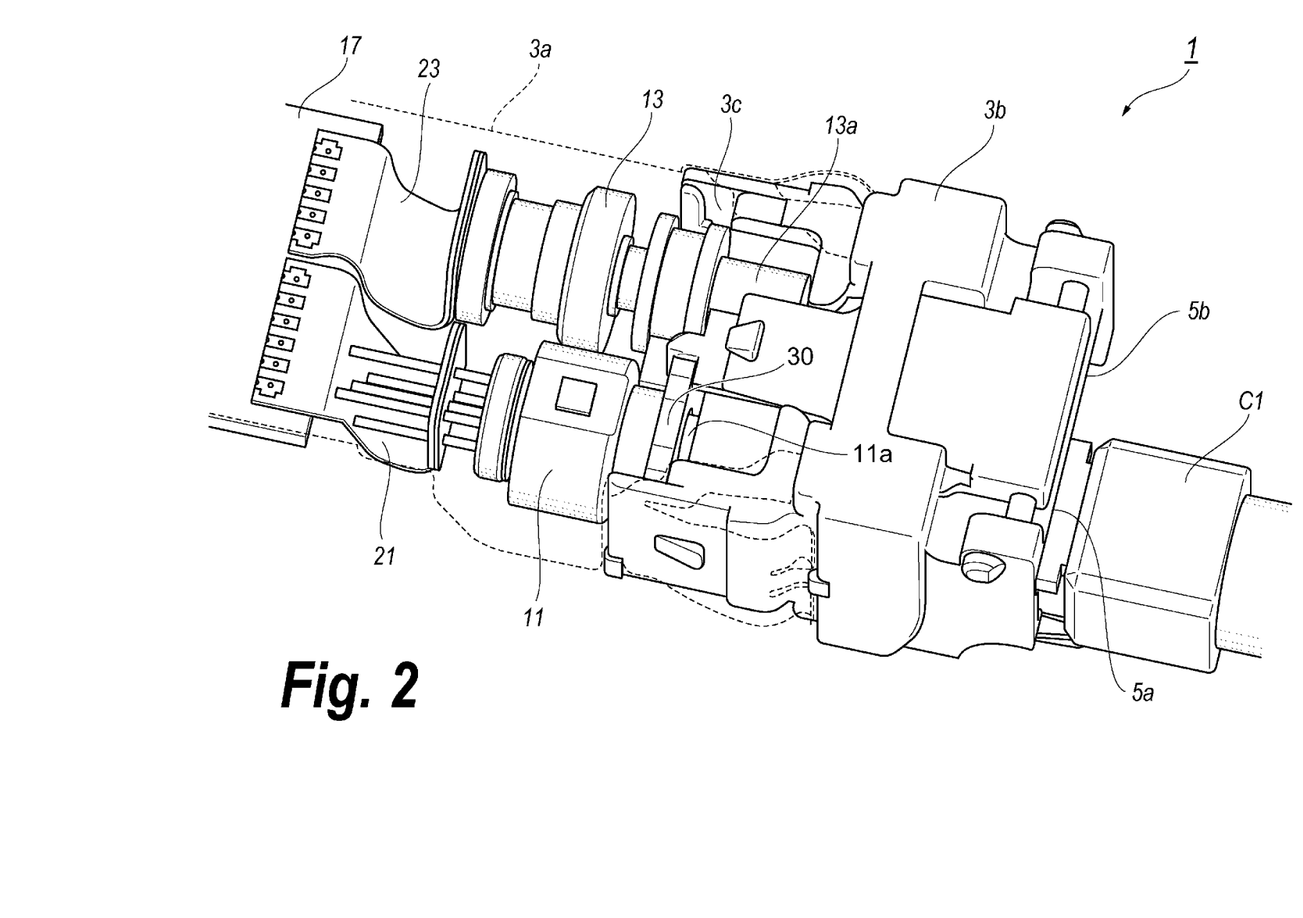
FIG. 2 shows a front portion of the optical transceiver, wherein the receptacle receives one of optical connectors for the optical reception.
Figure 3:
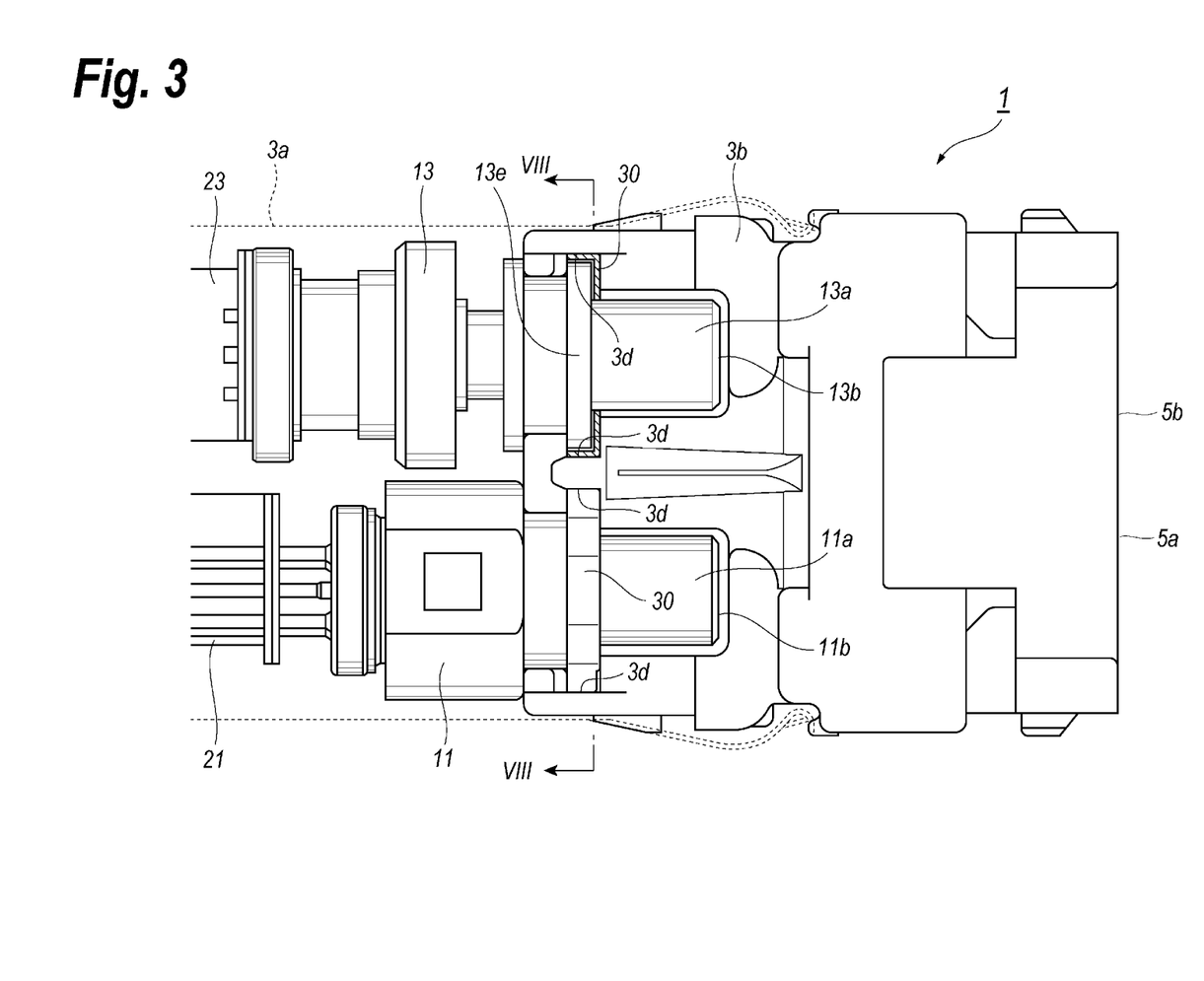
FIG. 3 is a plan view showing a positional relation between two optical subassemblies, the ROSA and the TOSA, and the metal cover in the optical transceiver shown in FIG. 1.

Referring to FIGS. 2 and 3, the openings, 5a and 5b, each provides in the deep end thereof with an optical subassembly, specifically, a receiver optical subassembly (ROSA) 11 for the receiver connector C1 and a transmitter optical subassembly (TOSA) 13 for the transmitter connector C3, respectively. The ROSA 11 includes a semiconductor device, typically a semiconductor photodiode (PD), to convert an optical signal into a corresponding electrical signal and an optical coupling mechanism to couple the optical fiber in the connector C1 with the PD. While, the TOSA 13 includes another semiconductor device to convert an electrical signal into an optical signal, typically a semiconductor laser diode (LD), and an optical coupling mechanism to couple the LD optically with the optical fiber secured in the connector C3. The ROSA 11 and the TOSA 13 are secured and fixed to the receptacle 3b.

In the rear side of the ROSA 11 and the TOSA 13 is provided with a circuit board 17. The circuit board 17, which is fixed to the frame 3a, mounts various electrical components constituting circuits to control the ROSA 11 and the TOSA 13. The ROSA 11 is electrically connected with the circuit board with a flexible printed circuit (FPC) board 21, while, the other FPC board 23 connects the TOSA 13 electrically with the other circuit on the circuit board 17.

Figure 4:
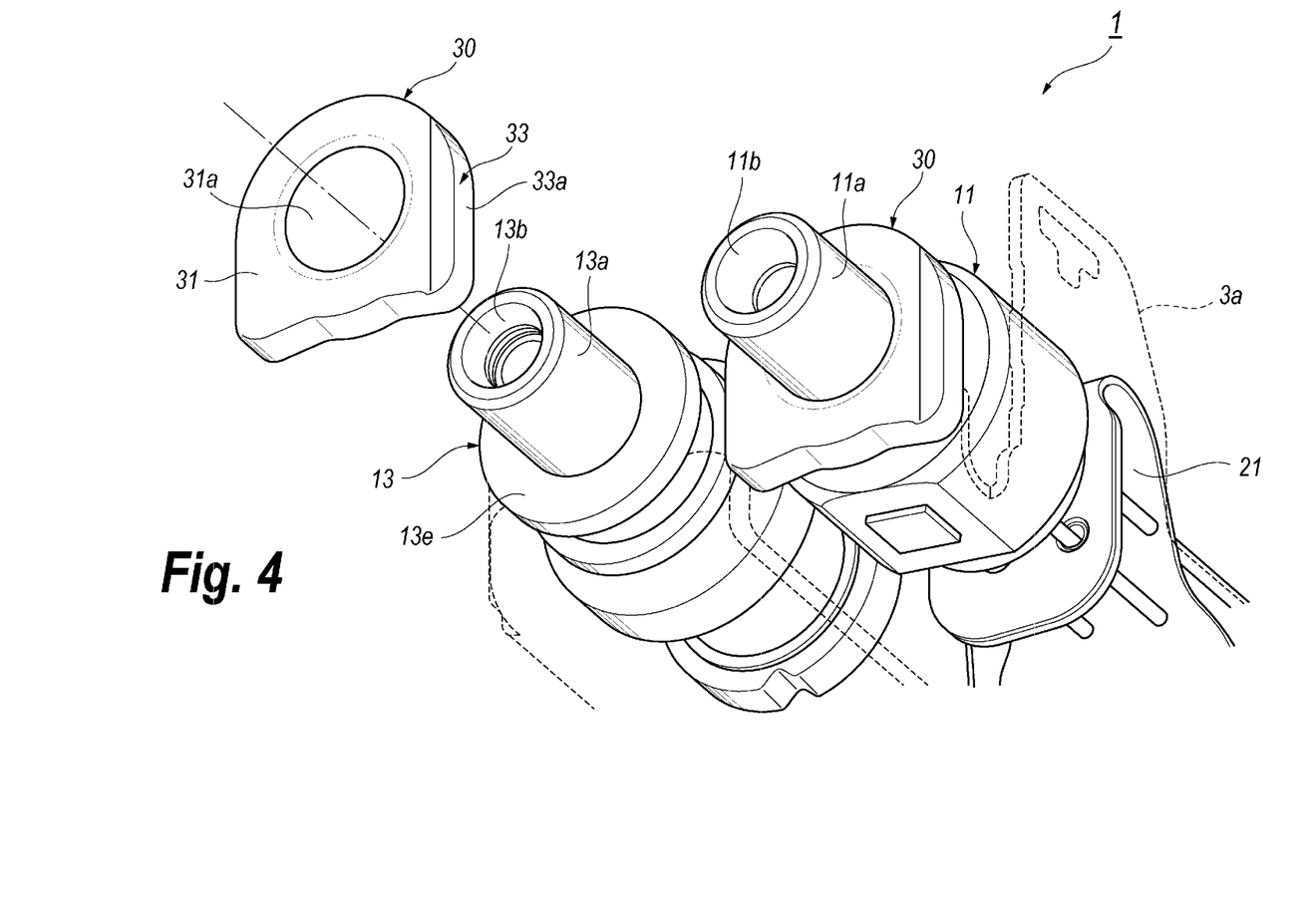

In a front end of the ROSA 11 is provided with a sleeve 11a made of resin, which optically couples the ROSA 11, in particular, the PD in the ROSA 11, with the optical connector C1 by receiving a ferrule secured in the connector C1. The sleeve 11a has a bore 11b into which the ferrule of the connector C1 is inserted, as illustrated in FIG. 4. The bore 11b is arranged behind the opening 5a of the receptacle 3b. Thus, the ROSA 11 may receive light emitted rearward from the optical fiber secured in the ferrule of the connector C1 and transmit an electrical signal converted from the light to the circuit on the circuit board 17 through the FPC board 21.

Similarly, the front end of the TOSA/3 provides a sleeve 13a made of resin which receives the ferrule secured in the connector C3 to couple the LD in the TOSA 13 optically with the fiber in the connector C3. The front end of the sleeve 13a also has a bore 13b into which the ferrule is inserted. This bore 13b is arranged behind the opening 5b of the receptacle 3b. The TOSA 13 may electrically couple with the circuit on the circuit board 17 through the FPC board 23. Thus, by receiving an electrical signal from the circuit on the circuit board 17 through the FPC board 23, the TOSA 13 may emit signal light toward the optical fiber secured in the optical connector C3. The optical transceiver 1 thus described may optically communicate with the optical fibers in the full duplex mode through the connection between the connector C1 and the ROSA 11 and between the connector C3 and the TOSA 13.

When the optical transceiver 1 operates in high speeds, for instance, a speed over 10 Gbps, the electro-magnetic interference (EMI) radiation should be reduced as possible because the EMI radiation easily becomes a noise source for peripheral equipments. The optical transceiver 1 according to the present embodiment assembles the receptacle 3b made of metal continuously with the metal frame 3a without any gaps therebetween, which may electrically isolate an inner space of the housing 3 that installs the ROSA 11, the TOSA 13 and the circuit board 17 from the periphery of the transceiver 1; thus, the inner space may be effectively shielded.

However, the sleeve 11a of the ROSA 11 and that 13a of the TOSA 13 are inevitably exposed to the outer space because those sleeves, 11a and 13a, are necessary to receive the external optical connector. The outer space means an area not shielded by the metal housing 3, while, the inner space means an area surrounded by the metal housing 3. Therefore, the area from the openings, 5a and 5b, of the receptacle 3b to the sleeves, 11a and 13a, corresponds to the outer space of the housing 3. The arrangement where the sleeves, 11a and 13a, are exposed in the outer space brings a defective portion for the EMI radiation. Moreover, the resin made sleeves, 11a and 13a, inherently show less EMI tolerance.

Figure 5:
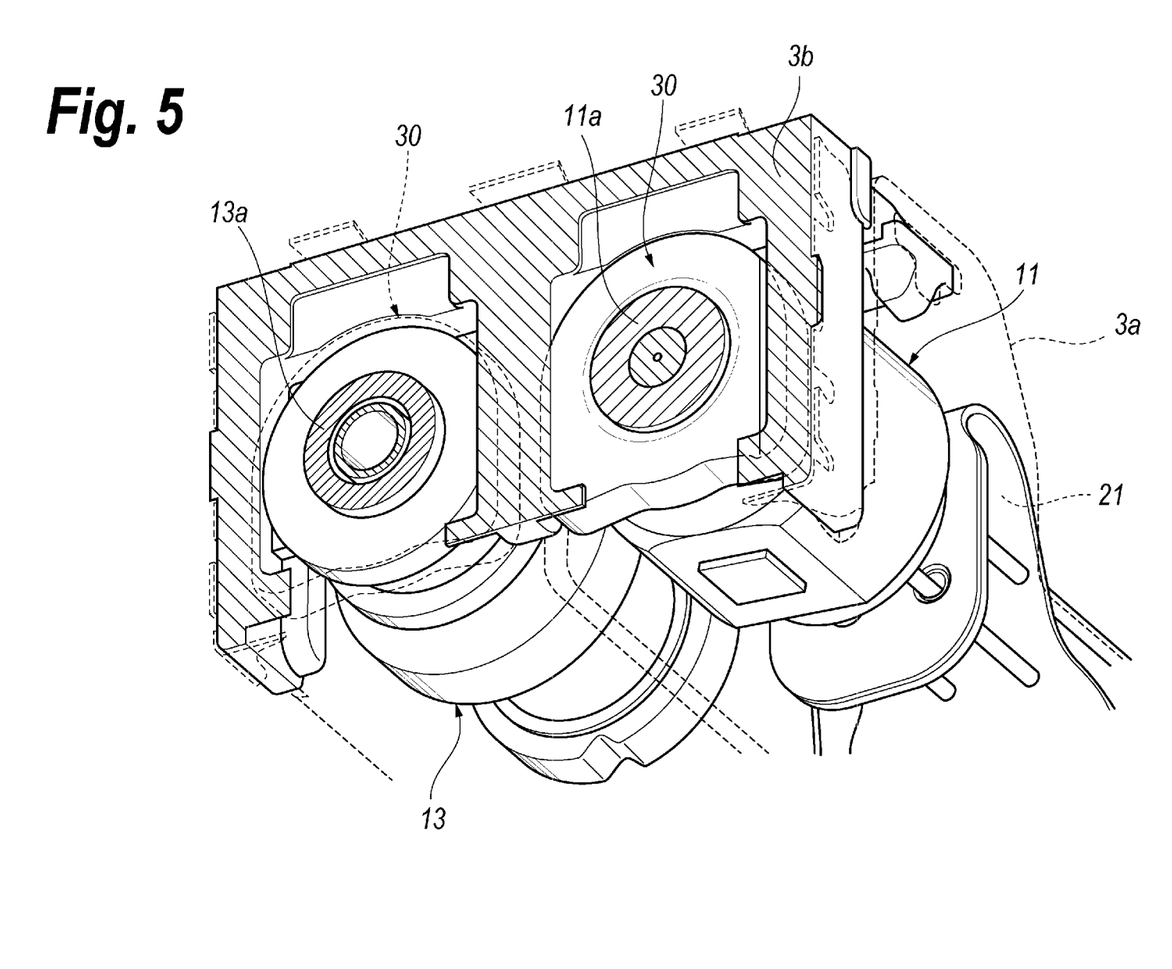
FIG. 5 is a partial cross section of the front portion of the optical transceiver, wherein the receptacle and the sleeve are broken to show the cross section thereof.
Figure 6A:
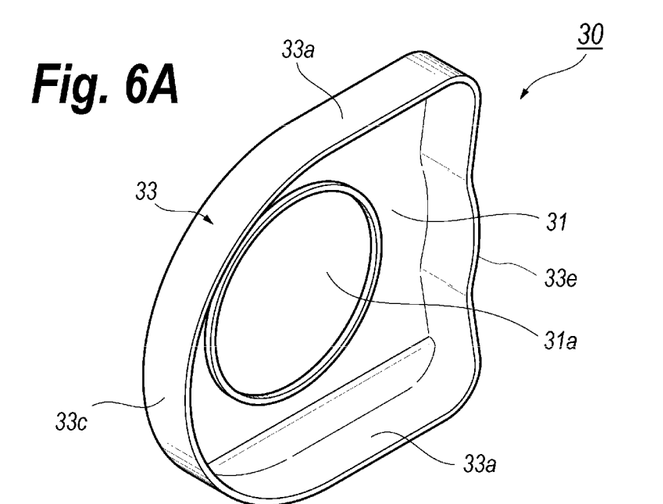
Figure 6B:
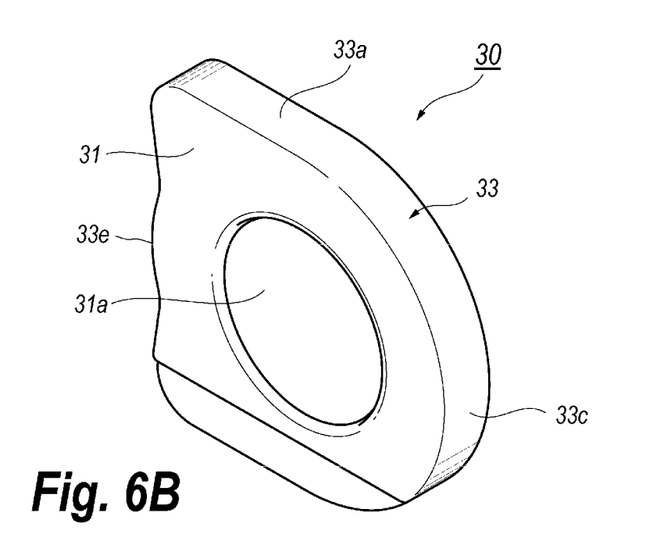

Accordingly, as illustrated in FIGS. 4 to 6, the optical transceiver 1 according to the present embodiment provides a metal cover 30 that receives the sleeve, 11a and 13a, in the center opening 31a thereof. The metal cover 30 may be made of metal, preferably aluminum. As shown in FIGS. 6A and 6B, the metal cover 30 provides a plate portion 31 with the center opening 31a whose dimension is slightly greater than the outer diameter of the sleeve, 11a and 13a, which causes a slight gap between the outer surface of the sleeve, 11a and 13a, and the inner edge of the opening 31a. The metal cover 30 is assembled with the receptacle 3b as being apart from the sleeve, 11a and 13a.

The metal cover 30 further provides an edge portion 33 extending rearward from the edge of the plate portion 31. The edge portion 33 includes parallel portions 33a putting the opening 31a therebetween and an arched portion 33c connecting the parallel portions 33a. The edge portion 33 expands along the longitudinal direction of the optical transceiver 1, that is, as being apart from the plate portion 31, before it is assembled with the receptacle 3b. The metal cover 30 may be formed by spinning of a metal sheet.

Figure 7:
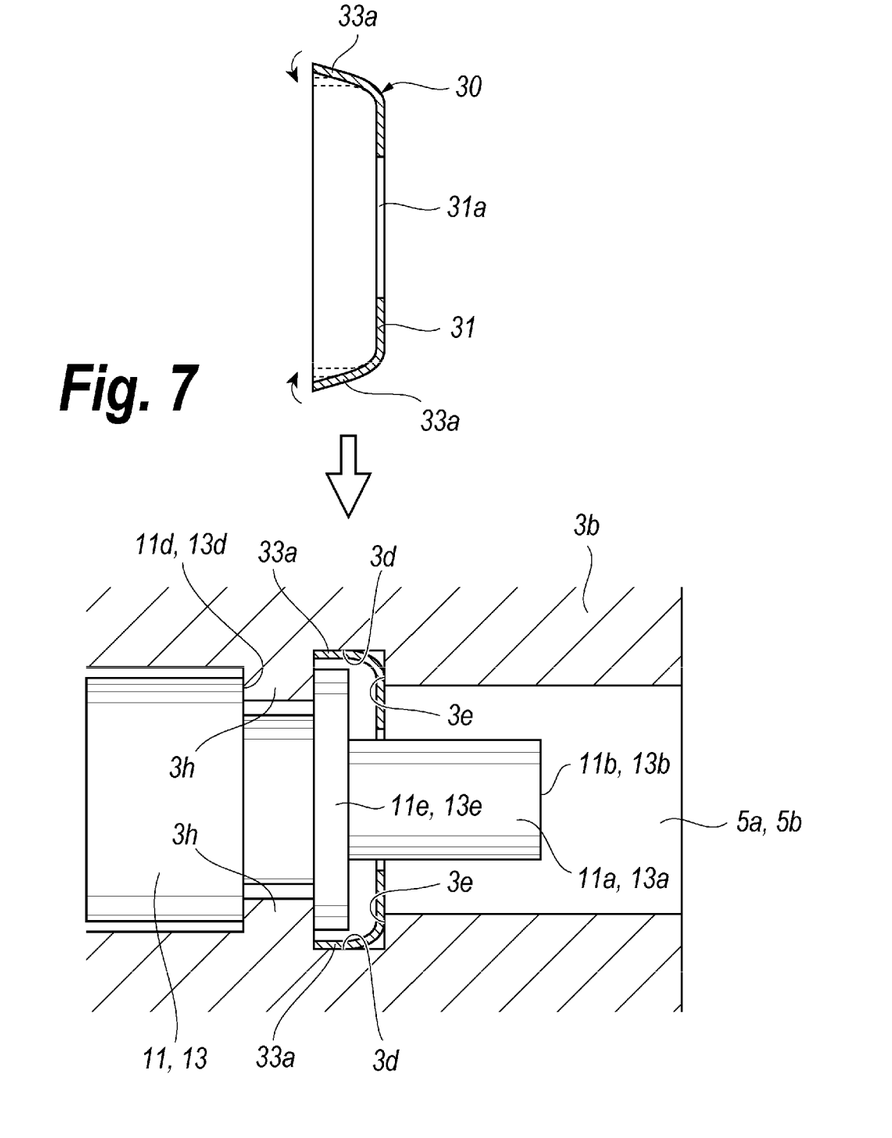
FIG. 7 schematically shows a process to set the metal cover and the flange of the optical subassembly in the groove of the receptacle.
Figure 8:
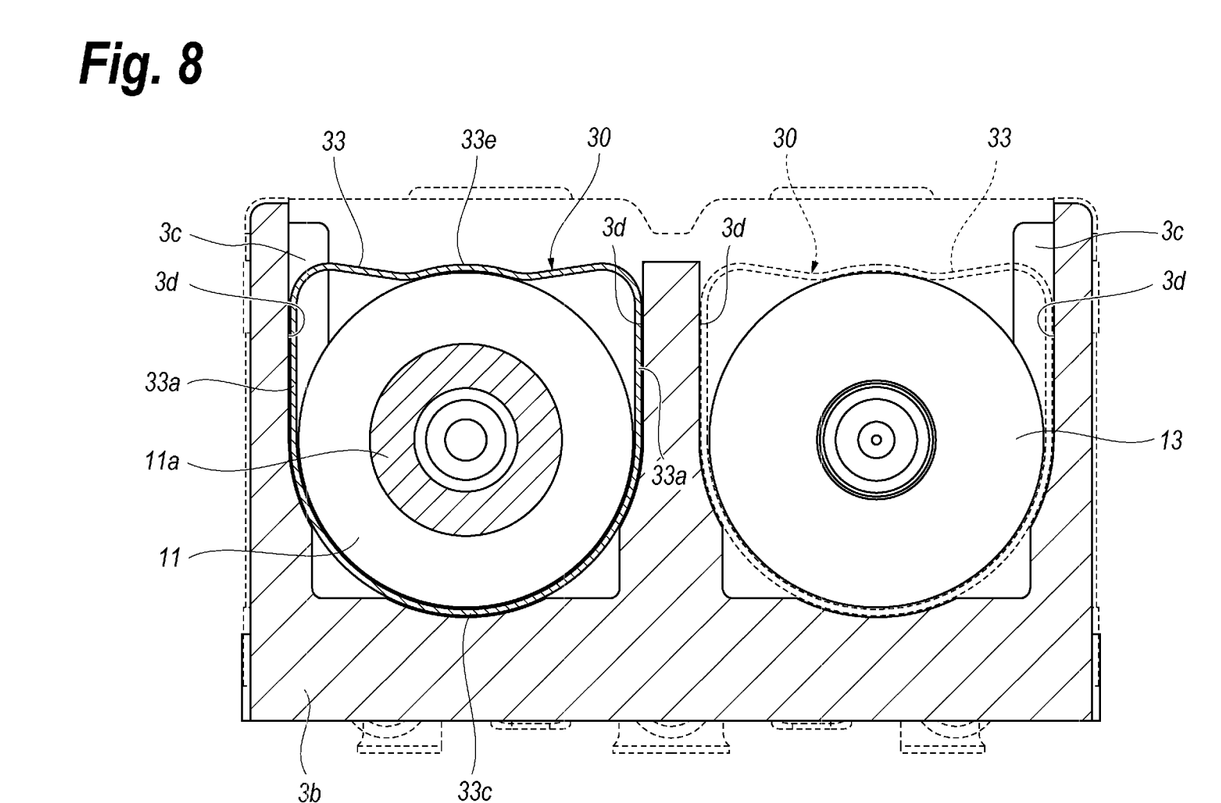
FIG. 8 is a cross section taken along the line VIII-VIII, marked in FIG. 3.

The metal cover 30 is assembled with the receptacle 3b. Specifically, as illustrated in FIGS. 7 and 8, the receptacle 3b provides a pair of grooves 3c each facing the other to receive the metal cover 30. Setting the metal cover 30 into the groove 3c, the edge portion 33 expanding along the longitudinal direction of the transceiver 1 is deformed so as to shrink the end thereof. The parallel portions 33a of the metal cover 30 are pressed to respective bottom of the grooves 3c to set the metal cover 30 in the receptacle 3b, while, the plate portion 31 in the periphery thereof is pressed to the side 3e of the groove 3c and to set the position of the metal cover 30 along the longitudinal direction. As illustrated in FIG. 7, the grooves 3c also receive the flange, 11e or 13e, of the ROSA 11 or the TOSA 13. However, the distance between the parallel portion 33a of the metal cover 30 is set to be slightly wider than the diameter of the ROSA 11 and the of the TOSA 13; accordingly, the metal cover 30 is set so as to be apart from the flange, 11e and 13e, of the ROSA 11 and that of the TOSA 11.

Figure 9:
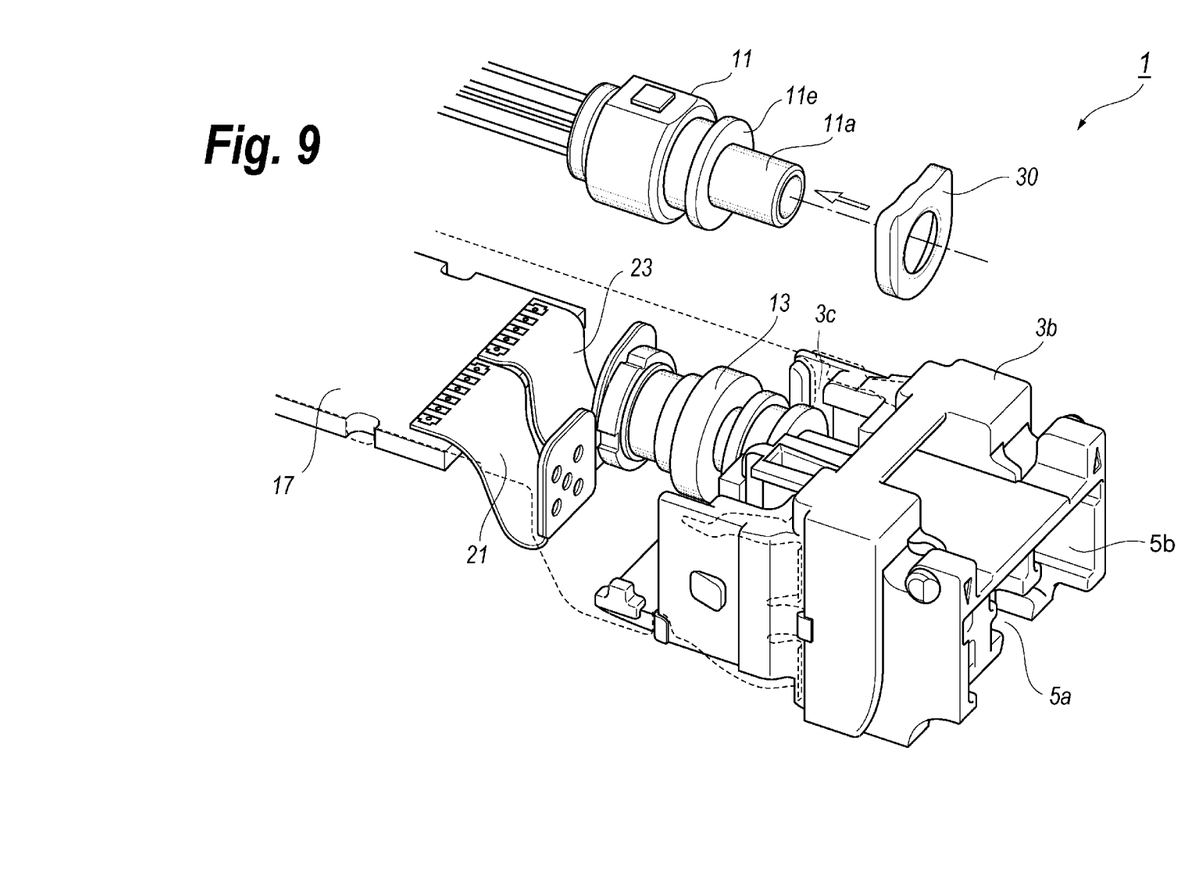
FIG. 9 shows a process to set the metal cover in the sleeve of the optical subassembly.
Figure 10:
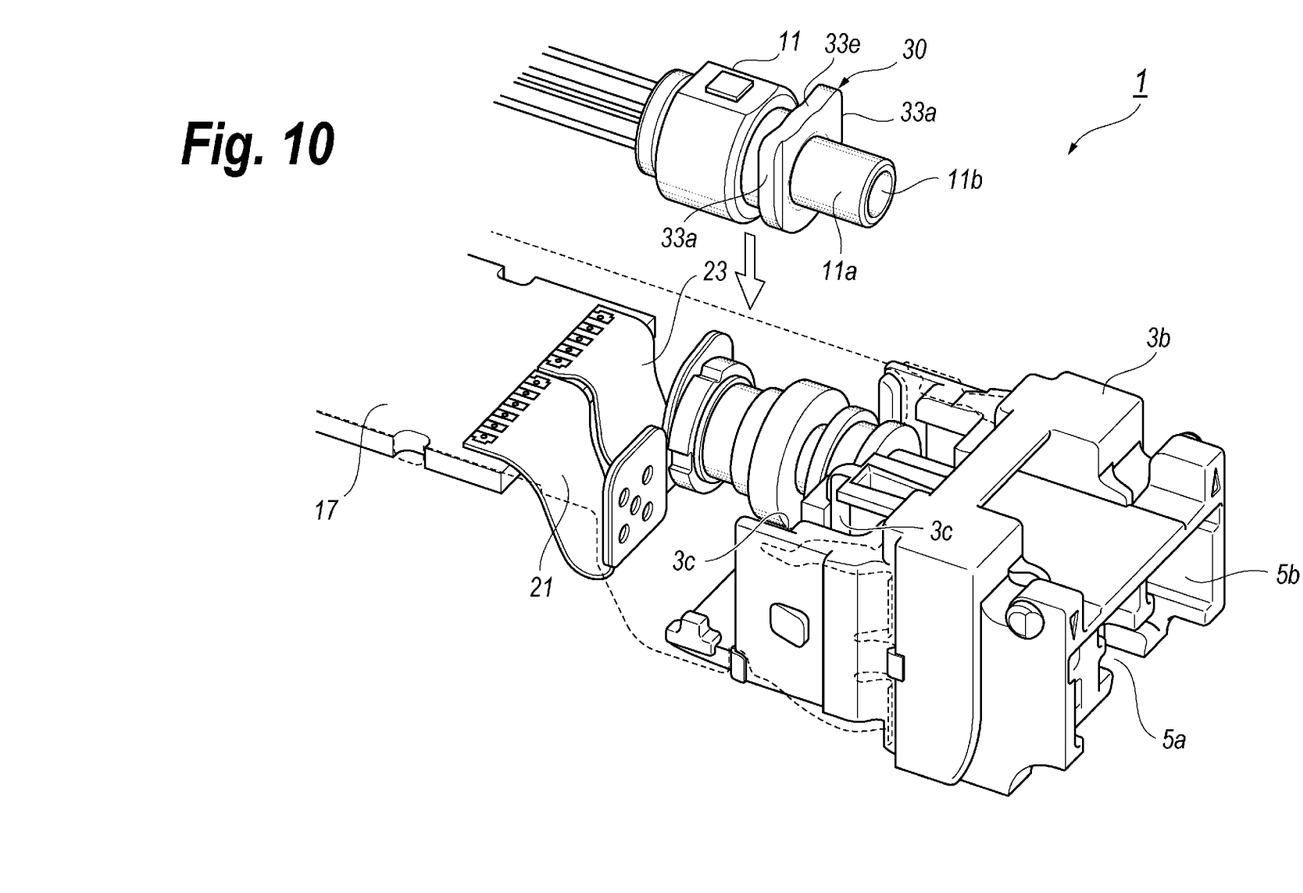
FIG. 10 shows a process subsequent to the process shown in FIG. 9.

In the assembly of the optical transceiver 1, the metal cover 30 is first attached with the sleeve 11a of the ROSA 11 such that the edge portion 33 faces rearward so as for the flange 11e to be overlaid by the cover 30, as shown in FIG. 9. Next, the ROSA 11 and the metal cover 30 are set in the grooves 3c as the arched portion 33c of the cover 30 is first inserted therein, which is shown in FIG. 10. The parallel portion 33a of the cover 30 comes in contact with the bottom 3d of the groove 3c as being deformed. Thus, the metal cover 30 is securely set within the groove 3c and the electrical conduction between the metal cover 30 and the receptacle 3b may be performed. A portion of the edge portion 33 opposite to the arched portion 33c is formed so as to trace the outer shape of the flange, 11e and 13e, and this portion substantially makes a right angle to the plate portion 31; accordingly, the metal cover 30 may be manually set within the groove 3c by pushing this portion 33e. The other metal cover 30 for the TOSA 13 may be assembled with the receptacle 3b by a process similar to those described above.

The receptacle 3b may have a hollow, which comes in contact with the arched portion 33c of the cover 30, whose shape traces the arched shape of the cover 30. In this arrangement, a gap between the metal cover 30 and the receptacle 3b may be further narrowed to enhance the EMI tolerance.

Thus, the metal cover 30 may show a function to partition the housing 3 as passing the sleeves, 11a and 13a. Because the metal cover 30 comes in electrically contact with the receptacle 3b, the metal cover 30 may electrically shield the inner space of the housing 3. Thus, the optical transceiver 1 according to the present embodiment, viewed from the front, may shield the inner space of the housing 3 except for the opening 31a of the metal cover 30 through which the sleeve, 11a and 13a, pass. The optical transceiver 1 may also suppress the opening of the housing 3 to expose the sleeve, 11a and 13a, in minimum, which may effectively enhance the EMI tolerance of the transceiver 1.

Moreover, the ROSA 11 and the TOSA 13 are set on and fixed to the receptacle 3b. Specifically, as illustrated in FIG. 7, the projection 3h of the receptacle 3b is put between the flange, 11e and 13e, and the front surface, lid and 13d, of the body of the ROSA 11 and that of the TOSA 13; specifically, the projection 3h may be a saddle to mount a portion between the flanges of the ROSA 11 or the TOSA 13. While; the metal cover 30 is also set on and fixed to the receptacle 3b. Thus, the metal cover 30 and two optical subassemblies, 11 and 13, are independently set on and fixed to the receptacle 3b. The metal cover 30 is apart from the flange, 11e and 13e. Therefore, the metal cover 30 does not mechanically operate on the subassemblies, 11 and 13, which means that the optical coupling between two subassemblies, 11 and 13, and respective optical connectors, C1 and C3, is not influenced by the metal cover.

In the embodiment thus described, the metal cover 30 forms a slight gap to the sleeve, 11a and 13a; but the metal cover 30 may be in contact with the outer surface of the sleeve, 11a and 13a. Even in this arrangement, it is important that the metal cover 30 does not influence mechanically to the sleeve, 11a and 13a. A metal cover made of relatively soft metal such as aluminum is preferable to absorb the mechanical stress affected to the sleeve, 11a and 13a, even the metal cover 30 comes in contact to the sleeve.

(Second Embodiment)

Figure 11:
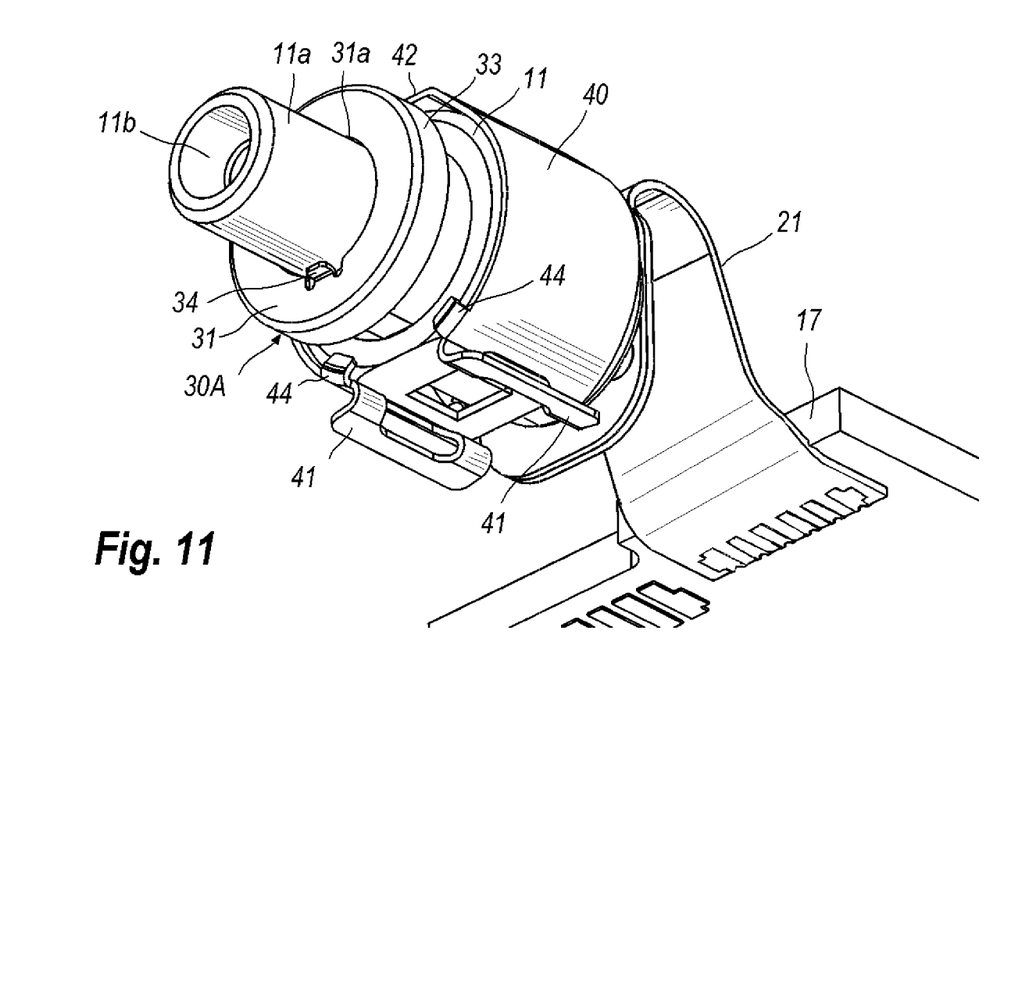
FIG. 11 shows an optical subassembly assembled with a side cover according to the second embodiment of the invention.

FIG. 11 is a perspective view of a ROSA according to the second embodiment of the present invention. The ROSA 11 shown in FIG. 11 provides a metal cover 30A with a circular outer shape, while, the metal cover 30 of the first embodiment has the U-shaped appearance. In a center of the plate portion 31 of the metal cover 30A is formed with the opening 31a through which the sleeve 11a passes. The bore of the opening 31a is slightly greater than the outer diameter of the sleeve 11a, which is the same with those of the first embodiment.

The metal cover 30A of the present embodiment provides a finger 34 rising from the edge of the opening 31a; but the inner surface of the finger 34 positions in the outside of an imaginary circle of the opening 31a. Accordingly, the inner edge of the finger 34 does not come in contact to the sleeve 11a after the ROSA 11 is set within the transceiver. The finger 34 has a length of around 0.3 mm and has a function to prevent the metal cover 30A from slipping out from the sleeve 11a during the assembly of the ROSA 11.

Figure 12:
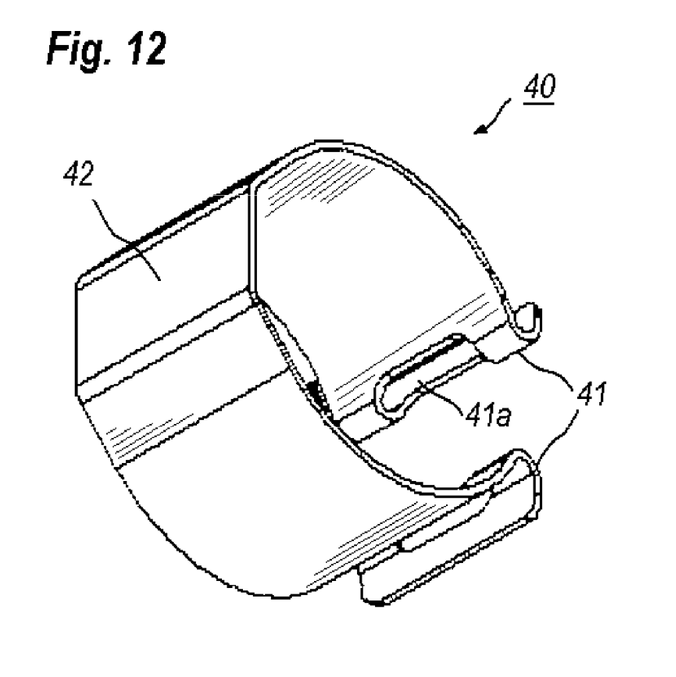
FIG. 12 is a perspective view of the side cover shown in FIG. 11.

The ROSA 11 further provides a side cover 40 whose shape is shown in FIG. 12 in detail. The side cover 40, which is made from a metal sheet, has a cross section of $\Omega$-shape with a flat top 42 and two legs 41 folded outwardly. In a root portion of the legs 41 is formed with a longitudinal opening not only to form the folding back easily but to soften the elasticity of the folded legs. In the front edge of the side cover 40 is provided with a finger 44, which is not shown in FIG. 12 but illustrated in FIG. 11. The body of the ROSA 11 is inserted into a center opening of the side cover 40, and the finger 44 may prevent the side cover 40 from slipping out from the body of the ROSA 11 during the assembly.

Figure 13:
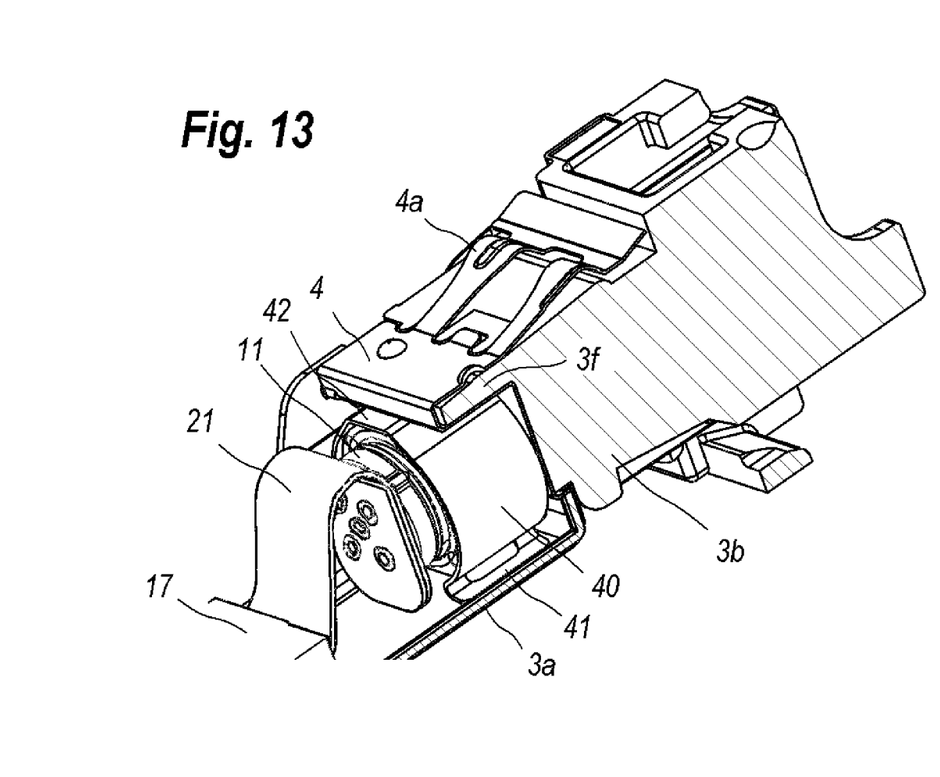
FIG. 13 shows the optical transceiver installing the optical subassembly attached with the side cover and assembled in the receptacle, wherein the receptacle and the frame are shown in the cross section thereof.
Figure 14:
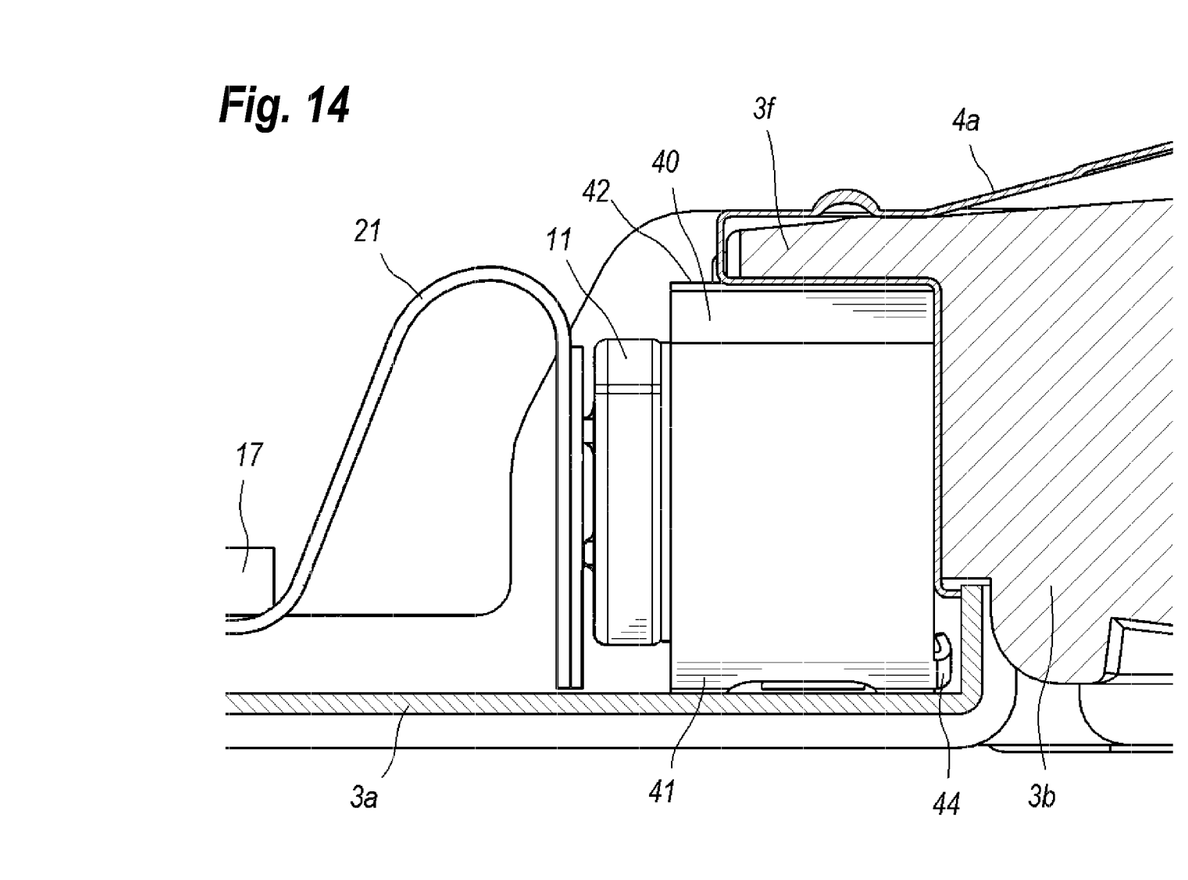
FIG. 14 is a side view of the optical subassembly attached with the side cover.

FIG. 13 is a perspective view of the ROSA 11 assembled with the side cover 40, where the ROSA 11 is installed in the transceiver 1, and FIG. 14 is a side cross section of the transceiver 1. In FIGS. 13 and 14, the frame 3a and the receptacle 3b are partially cut to show the ROSA 11 explicitly.

As shown in FIGS. 13 and 14, the leg 41 of the side cover 40 comes in contact with the bottom of the frame 3a, while, the flat top 42 thereof comes in contact with the overhung portion 3f of the receptacle 3b. The rear portion of the receptacle 3b provides the ground finger 4 whose shape traces the cross section of the receptacle 3b. This ground finger 4 has a front portion 4a which is bent outwardly to come in securely contact with the inner surface of the cage of the host system, where the transceiver 1 shown in FIG. 13 is practically used by inserting into the cage. Because the ground finger 4 in the front portion 4a thereof comes in contact with the cage, the chassis ground (frame ground) may be stably conducted from the host system to the optical transceiver 1. The side cover 40, assembled with the body of the ROSA 11 so as to surround it, comes in contact with the ground finger 4 in the overhung portion 3f by the flat top 42 thereof and also comes in contact with the frame 3a by the leg 41 thereof. Thus, the arrangement of the side cover 40 may not only stabilize the frame ground but securely prevent the EMI radiation from leaking out from the optical transceiver 1. The height of the metal cover 40, from the bottom of the leg 41 to the flat top 42, is set to be slightly greater by around 1 mm than a space from the bottom of the frame 3a to the underside of the overhung portion 3f. Accordingly, assembling the optical transceiver 1, the metal cover 40 is hard to be disassembled. Moreover, the softened leg 41 of the metal cover 40 may cause a lesser mechanical influence to the frame 3a and the receptacle 3b.

Moreover, the finger 44 of the side cover 40 shows a repulsive force against the front surface of the body of the ROSA 11 because the finger 44 is folded inwardly. This repulsive force pushes the side cover 40 forward, which makes the front edge of the side cover 40 in securely contact with the rear surface of the ground finger 4, which further stabilize the frame ground.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. An optical transceiver optically coupled with an optical connector, comprising:
   a metal frame;
   a receptacle assembled with said metal frame;
   an optical subassembly including a sleeve and a body; and
   a metal cover fixed to said receptacle including a plate portion and an edge portion, said plate portion having an opening through which said sleeve of said optical subassembly passes, said opening having a diameter greater than a diameter of said sleeve, said edge portion extending from an edge of said plate portion, said edge portion being fitted in a groove formed in said receptacle, wherein said edge portion expands as being apart from said plate portion before said metal cover is assembled with said receptacle, and wherein said metal cover is physically apart from said sleeve of said optical subassembly when said metal cover is assembled with said receptacle.

2. The optical transceiver of claim 1,
wherein said groove of said receptacle provides a bottom butting against said edge portion of said metal cover.

3. The optical transceiver of claim 1,
wherein said groove of said receptacle provides a side coming in contact with a periphery of said plate portion of said metal cover.

4. The optical transceiver of claim 1,
wherein said sleeve provides a flange set in said groove of said receptacle, and said edge portion of said metal cover extends from whole edges of said plate portion,
wherein said flange has a diameter less than a distance between edge portions facing each other to form a gap against said edge portion.

5. The optical transceiver of claim 1,
wherein said metal cover provides a finger raised from an inner edge of said opening, said finger having an inner surface being positioned in an outside of an imaginary circle of said opening.

6. The optical transceiver of claim 1,
wherein said metal cover has a U-shaped appearance, wherein said edge portions corresponding to edges of said U-shape in parallel to others are set in said groove of said receptacle.

7. The optical transceiver of claim 1,
further comprising a side cover made of metal that covers a side of said body of said optical subassembly and comes in electrically contact with said metal frame and said receptacle.

8. The optical transceiver of claim 1,
wherein a side cover provides a Ω-shaped cross section with a leg folded outwardly and a flat top opposite to said leg,
wherein said leg comes in contact with said metal frame, and said flat top comes in contact with said receptacle.

9. The optical transceiver of claim 1,
wherein a side cover provides a finger raised at a front edge of said side cover,
wherein said finger comes in contact with a front surface of said body of said optical subassembly.

10. The optical transceiver of claim 9,
further comprising a ground finger,
wherein said receptacle has an overhung portion in a rear side thereof, said ground finger having a cross section tracing said overhung portion of said receptacle,
wherein said side cover comes in contact with said receptacle through said ground finger.

11. The optical transceiver of claim 10,
wherein said ground finger comes in contact with a cage into which said optical transceiver is inserted.

12. The optical transceiver of claim 1,
wherein said sleeve is made of resin.

* * * * *